(12) United States Patent
Marroquin et al.

(10) Patent No.: US 7,478,889 B2
(45) Date of Patent: Jan. 20, 2009

(54) LATCH SYSTEM AND METHOD FOR AN INFORMATION HANDLING SYSTEM

(75) Inventors: Marco A. Marroquin, Pflugerville, TX (US); John D. Revell, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 372 days.

(21) Appl. No.: 11/141,535

(22) Filed: May 31, 2005

(65) Prior Publication Data

US 2006/0268501 A1    Nov. 30, 2006

(51) Int. Cl.
*A47B 97/00* (2006.01)

(52) U.S. Cl. .................................. 312/223.1; 361/683

(58) Field of Classification Search ................. 312/323, 312/222, 302, 303, 322, 327, 328, 223.2, 312/257.1, 265.6, 223.1; 292/49, 194, 195, 292/215, 197, 210, 335, DIG. 37, 146, DIG. 38, 292/19, 80, 81, 83; 220/324, 315, 326, 811; 361/726, 747, 683; 224/926
See application file for complete search history.

(56) References Cited

U.S. PATENT DOCUMENTS

| | | | | | |
|---|---|---|---|---|---|
| 2,446,113 | A | * | 7/1948 | Spiller | 292/30 |
| 2,533,377 | A | * | 12/1950 | Keef | 292/227 |
| 2,629,435 | A | * | 2/1953 | Dadswell | 160/190 |
| 4,714,284 | A | * | 12/1987 | Varlet | 292/91 |
| 5,004,431 | A | * | 4/1991 | Previato et al. | 439/358 |
| 5,711,554 | A | * | 1/1998 | Brown et al. | 292/19 |
| 6,045,173 | A | * | 4/2000 | Tiesler et al. | 296/37.8 |
| 6,603,655 | B2 | * | 8/2003 | Hrehor et al. | 361/683 |
| 2003/0160460 | A1 | * | 8/2003 | Crisp et al. | 292/83 |

* cited by examiner

*Primary Examiner*—James O Hansen
(74) *Attorney, Agent, or Firm*—Haynes and Boone, LLP

(57) ABSTRACT

A rotating door panel is coupled to a chassis. A pair of arms extend from a base connected to the chassis. The arms are movable between a first configuration and a second configuration. A latch is connected to the chassis, and a stryker connected to the door panel is engageable with the arms. The stryker is operable to angularly approach the latch for engagement with the latch.

7 Claims, 14 Drawing Sheets

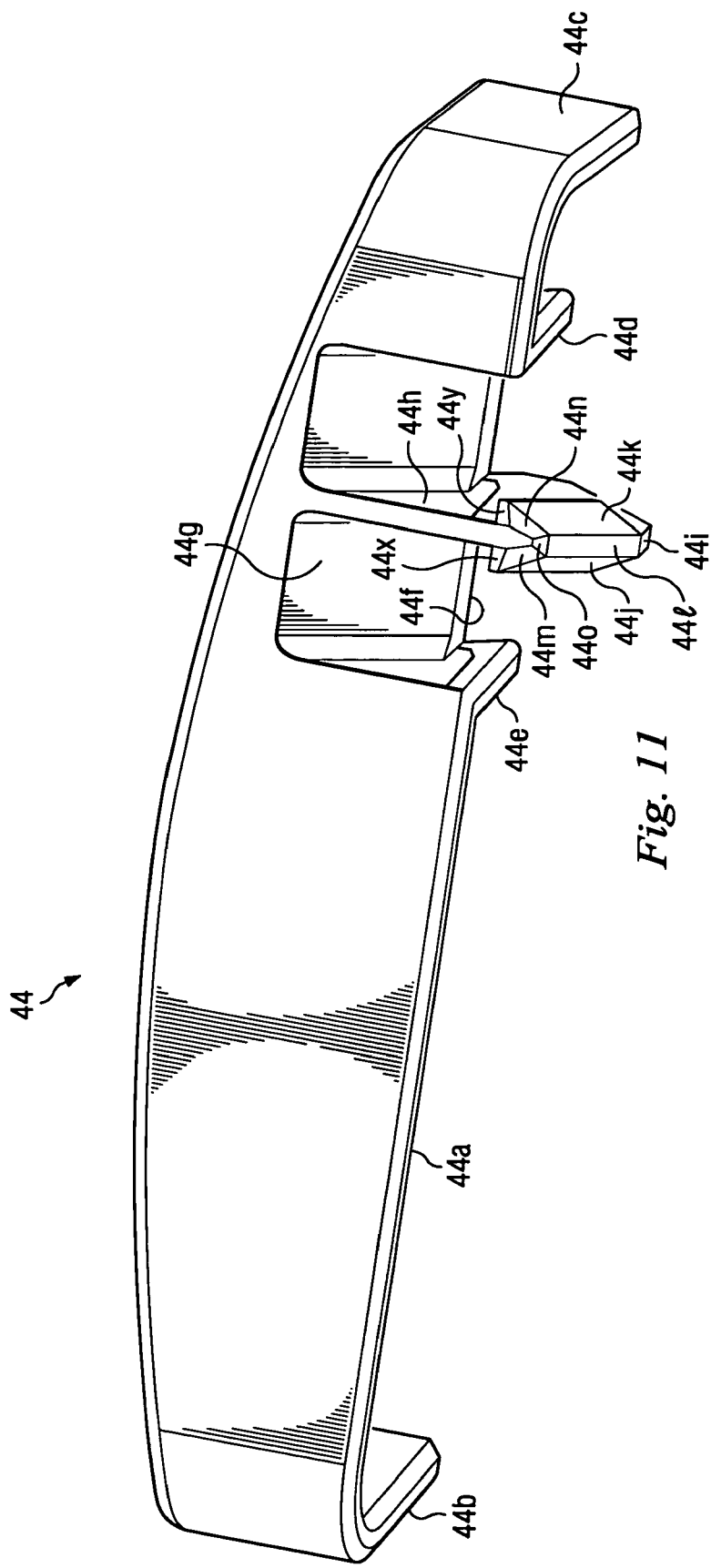

LATCH SYSTEM AND METHOD FOR AN INFORMATION HANDLING SYSTEM

CROSS REFERENCE TO RELATED APPLICATION

This application is related to co-pending patent application Ser. No. 11/141,539, filed on May 31, 2005, the disclosure of which is incorporated herein by reference.

BACKGROUND

This disclosure relates generally to an information handling system and more particularly to a latch system for use with a chassis of an information handling system.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The use of a latch system to latch a door, or moving panel, on the chassis of an information handling system can improve cosmetics while protecting the peripherals and/or ports from damage. However, it is difficult to provide an optimum latch that can accommodate the operation of the door from any direction.

Therefore what is needed is a latch system that overcomes the above problem, among others.

SUMMARY

One embodiment accordingly, provides an information handling system comprising a chassis and a door panel rotatably coupled to the chassis. A component is coupled to the door panel and is adapted for movement relative to the chassis at an angle ranging from about 0 degrees to about 90 degrees, a base connected to the chassis, and a pair of spaced arms extending from the base.

BRIEF DESCRIPTION OF THE DRAWINGS

FIG. 11 is an enlarged perspective bottom view of the striker cap depicted in FIGS. 4A and 10.

DETAILED DESCRIPTION

Figure 1:
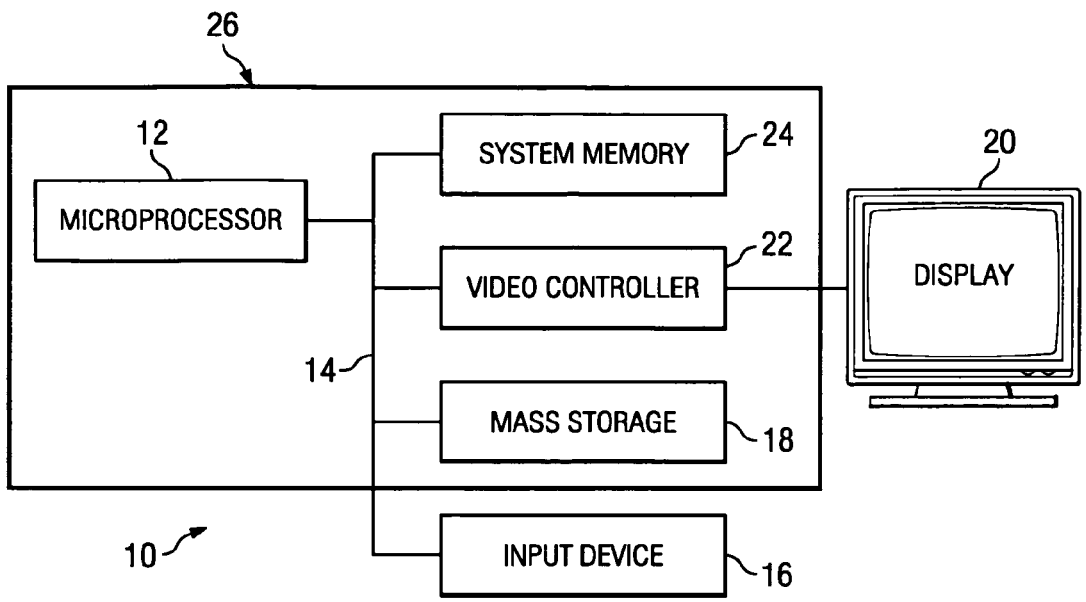
FIG. 1 is a diagrammatic view of an information handling system according to one embodiment.

Referring to FIG. 1, an information handling system is generally referred to by the reference numeral 10. For purposes of this disclosure, an information handling system may include any instrumentality or aggregate of instrumentalities operable to compute, classify, process, transmit, receive, retrieve, originate, switch, store, display, manifest, detect, record, reproduce, handle or utilize any form of information, intelligence or data for business, scientific, control, entertainment or other purposes. For example, an information handling system may be a personal computer, a PDA, a consumer electronic device, a network server or storage device, a switch router or other network communication device, or any other suitable device and may vary in size, shape, performance, functionality and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse and a video display. The information handling system may also include one or more buses operable to transmit communications between the various hardware components.

The information handling system 10 includes a microprocessor 12, which is connected to a bus 14, which, in turn, serves as a connection between the microprocessor 12 and other components of the information handling system 10. An input device 16 is coupled to the microprocessor 12 to provide input to the microprocessor 12. Examples of input devices include keyboards, touchscreens and pointing devices such as, for example, mouses, trackballs and trackpads. Programs and data are stored on one or more mass storage devices 18, which are coupled to the microprocessor 12. The one or more mass storage devices 18 may include, but are not limited to, such devices as hard disks, optical disks, magneto-optical drives, floppy drives and the like.

The information handling system 10 further includes a display 20, which is coupled to the microprocessor 12 by a video controller 22. A system memory 24 is coupled to the microprocessor 12 to provide the microprocessor with fast storage to facilitate execution of computer programs by the microprocessor. It is understood that other buses and intermediate circuits may be deployed between the components described above and the microprocessor 12 to facilitate interconnection between the components and the microprocessor. A chassis 26 houses the microprocessor 12, the one or more mass storage devices 18, the video controller 22 and the system memory 24; it is understood that one or more of the foregoing devices may be removed from the chassis and/or that one or more additional devices may be housed by the chassis.

Figure 2:
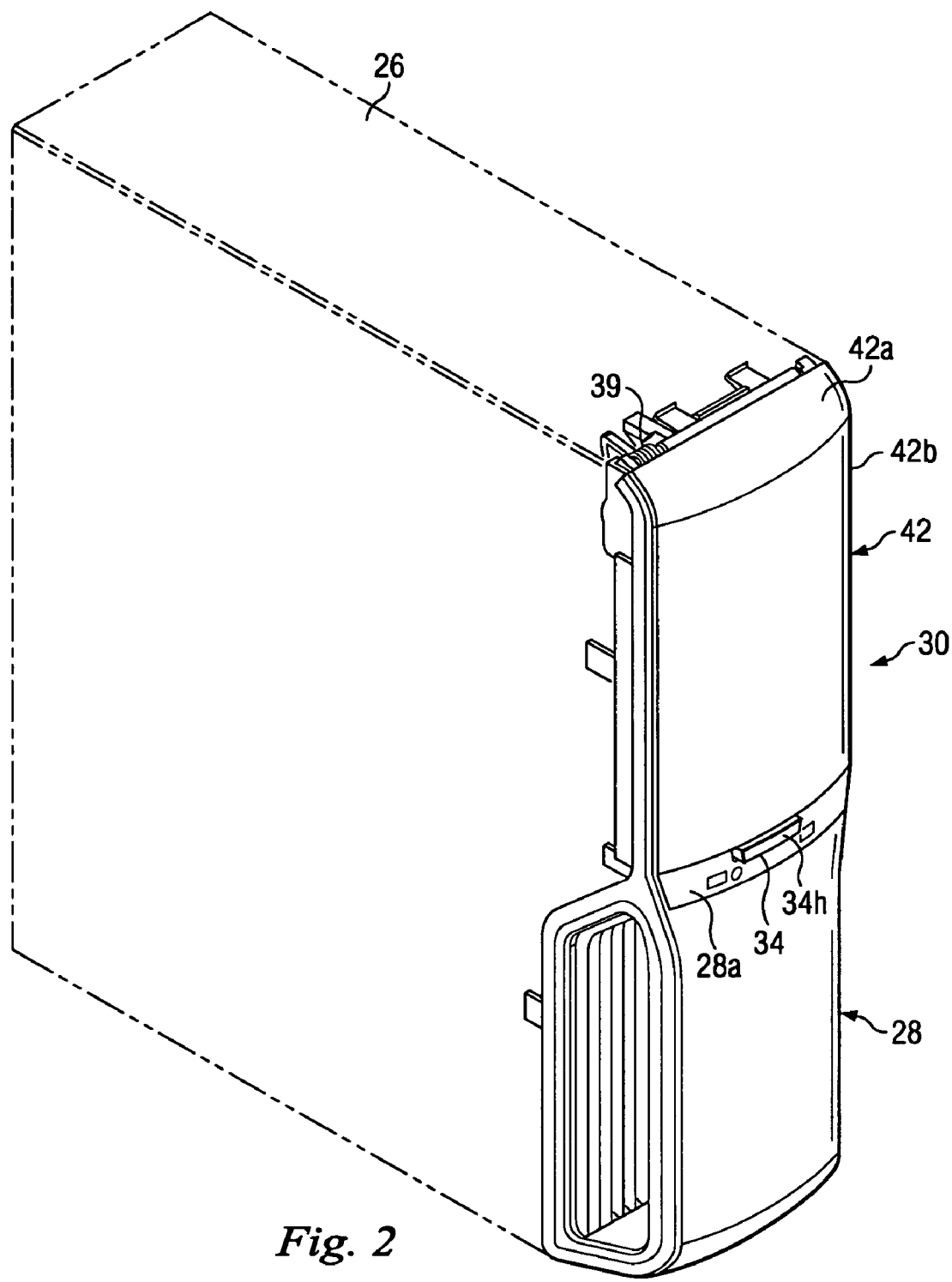
FIG. 2 is a perspective front view of a portion of the information handling system of FIG. 1 according to one embodiment.

Referring to FIG. 2, with continuing reference to FIG. 1, a front bezel 28 is connected to the chassis 26 in a conventional manner such as, for example, with snap-fit connections, heat-staked connections, fastener connections and/or any combination thereof. The front bezel 28 includes a frame 28a through which components of the information handling system 10 are viewable and/or accessible by users of the information handling system, with such components including, but not limited to, one or more USB ports, FireWire ports, audio ports, video ports, parallel ports, serial ports and/or other types of ports, one or more bays, one or more card readers, one or more LED status indicators and/or the equivalent thereof, one or more of the mass storage devices 18 and/or any combination thereof. A door panel assembly 30 is coupled to the front bezel 28 and will be described in detail later.

Figure 3:
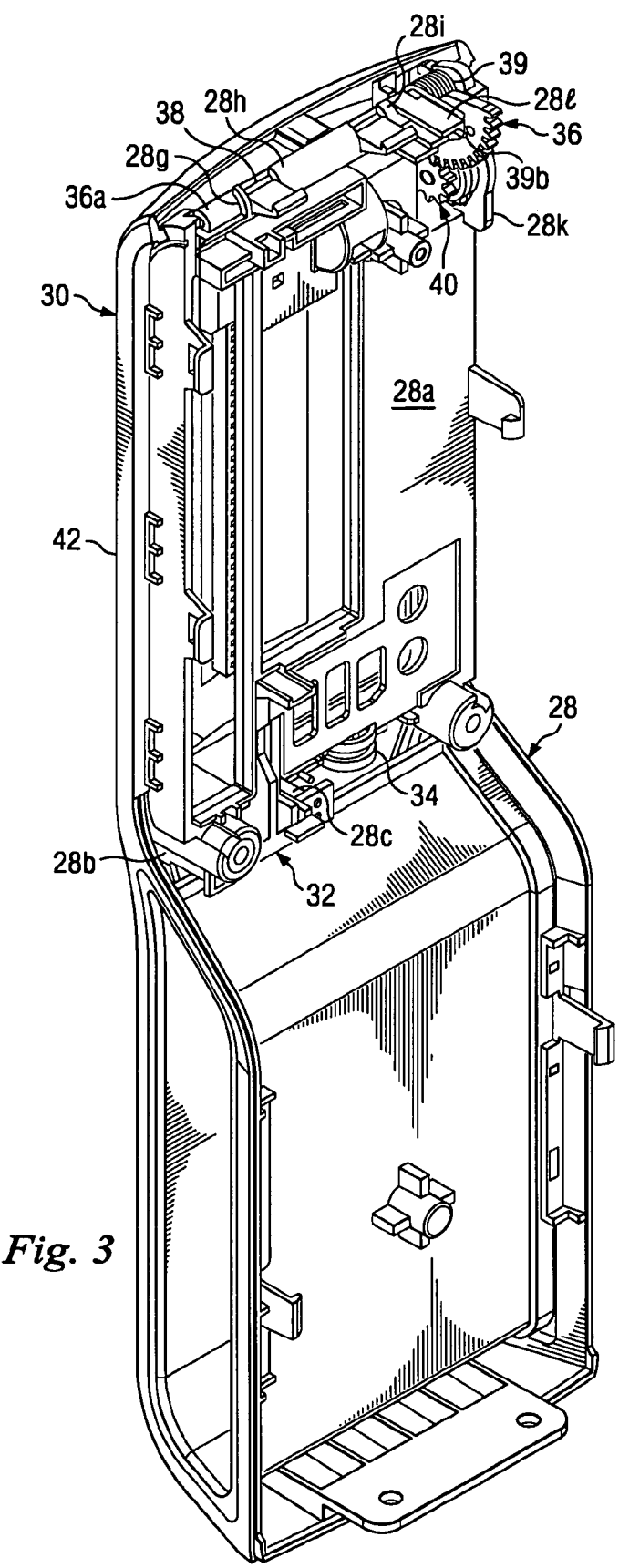
FIG. 3 is a perspective back view of the portion of the information handling system depicted in FIG. 2.
Figure 4:
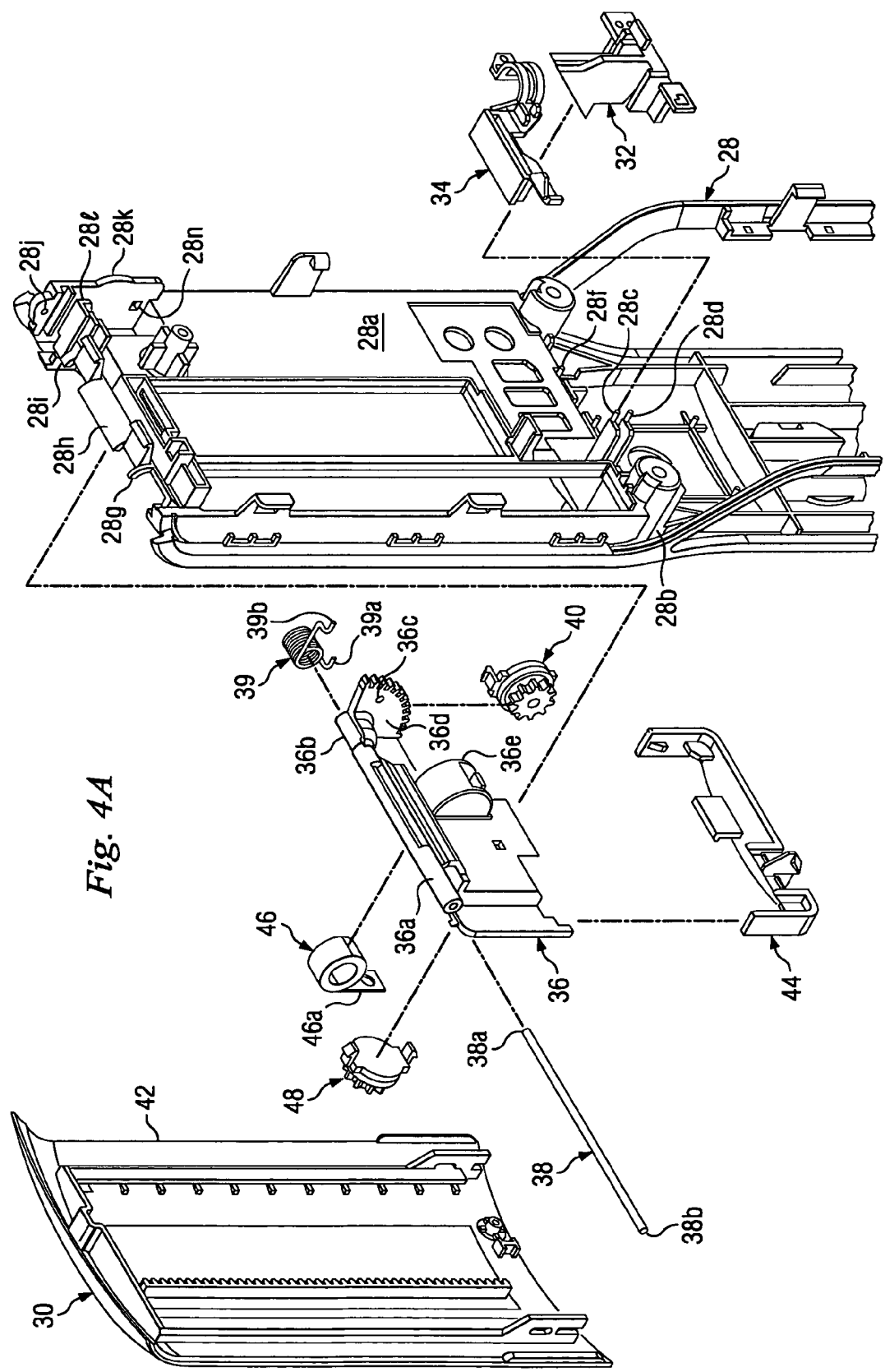
FIG. 4A is an exploded back view of the portion of the information handling system depicted in FIGS. 2 and 3.
FIG. 4B is a perspective view of a rotary damper depicted in FIG. 4A.
FIG. 4C is a perspective view of another rotary damper depicted in FIG. 4A.
Figure 5:
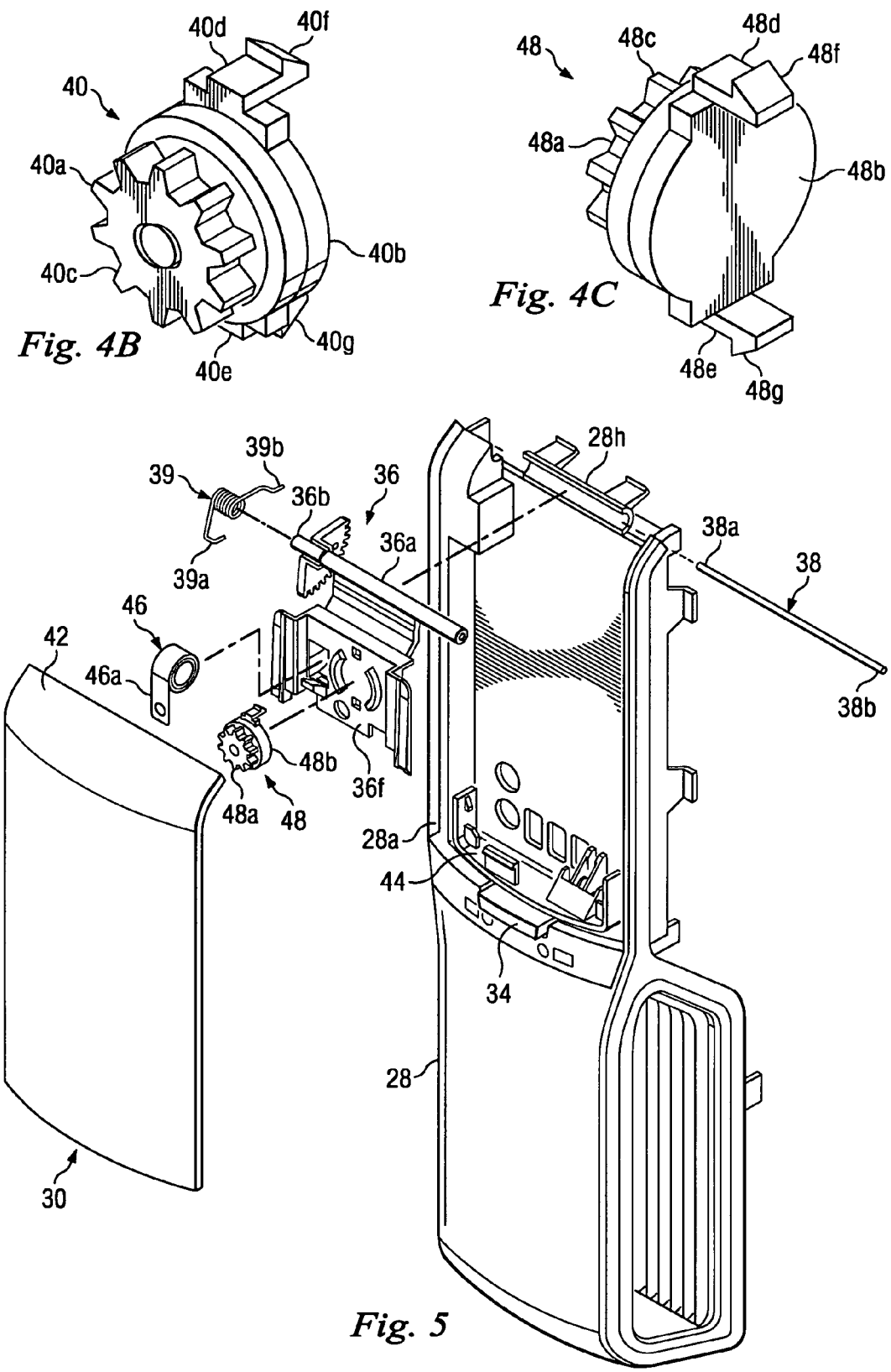
FIG. 5 is an exploded front view of the portion of the information handling system depicted in FIGS. 2 and 3.

Referring to FIGS. 3-5, with continuing reference to FIG. 2, a latch 32 is connected to the front bezel 28 via an L-shaped protrusion 28b and a pair of pins 28c and 28d extending from the frame 28a in a rearward direction. A button 34 is connected to the front bezel 28 via a pair of pins 28e and 28f extending from the frame 28a in a rearward direction (the pin 28e is concealed from view in FIG. 4).

A hinge plate 36 having a tubular portion 36a is hingedly connected to the front bezel 28, via a rod 38 having opposing ends 38a and 38b which extends through the tubular portion, so that arcuate portions 28g, 28h and 28i of the front bezel at least partially circumferentially extend about the tubular portion. The end 38a of the rod 38 extends into an opening 28j formed in a vertically-extending plate portion 28k of the front bezel 28 so that the front bezel captures and supports the rod 38. Although not depicted in FIG. 4, it is understood that the end 38b of the rod 38 is similarly captured and supported by the front bezel 28.

A reduced-diameter end portion 36b of the tubular portion 36a extends through a torsion spring 39 having ends 39a and 39b. The end 39a of the torsion spring 39 extends through a bore 36c formed through a gear portion 36d of the hinge plate 36, and the end 39b of the torsion spring extends through an opening (not shown) formed in an upside-down L-shaped protrusion 28l extending from the frame 28a in a rearward direction and disposed between the arcuate portion 28i and the plate portion 28k. It is understood that the torsion spring may have a predetermined spring rate such as, for example, a spring rate of 0.18 lb-in/degree. It is understood that the torsion spring 39 may have a surface finish such as, for example, a nickel plated surface finish.

A rotary damper 40 (FIG. 4B) is connected to the vertically-extending plate portion 28k of the front bezel 28. The rotary damper 40 includes a rotary portion 40a coupled to a base portion 40b, the rotary portion having a circumferentially-extending plurality of teeth 40c. A pair of protrusions 40d and 40e extend from the base portion 40b, the protrusions 40d and 40e having tapered and enlarged distal end portions 40f and 40g, respectively. It is understood that the rotary damper 40 has a torque rating and that the rotary portion 40a is adapted to rotate in place under conditions to be described.

The door panel assembly 30 includes a door panel 42 engaged with the hinge plate 36, and a striker cap 44 connected to the door panel. A spirally wound constant-force spring 46 is disposed in a hub portion 36e of the hinge plate 36, and a distal end 46a of the spring extends in a downward direction from the hub portion and is connected to the door panel 42. It is understood that the spring 46 may have a predetermined constant force such as, for example, a constant force of 1.5 lb.

A rotary damper 48 (FIG. 4C) is connected to the hinge plate 36 and includes a rotary portion 48a coupled to a base portion 48b, the rotary portion having a circumferentially-extending plurality of teeth 48c. A pair of protrusions 48d and 48e extend from the base portion 48c, the protrusions 48d and 48e having tapered and enlarged distal end portions 48f and 48g, respectively. It is understood that the rotary damper 48 has a torque rating and that the rotary portion 48a is adapted to rotate in place under conditions to be described. For reasons to be described, the torque rating of the rotary damper 48 is higher than the torque rating of the rotary damper 40.

Figure 7:
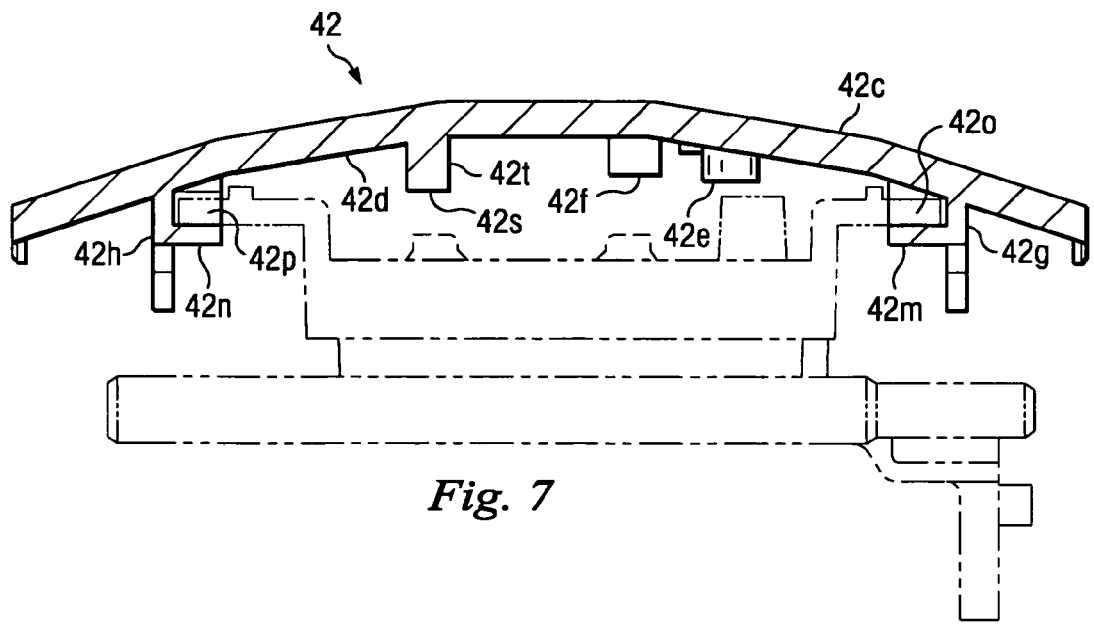
FIG. 7 is a sectional view of the door panel taken along line 7-7 of FIG. 6.
Figure 6:
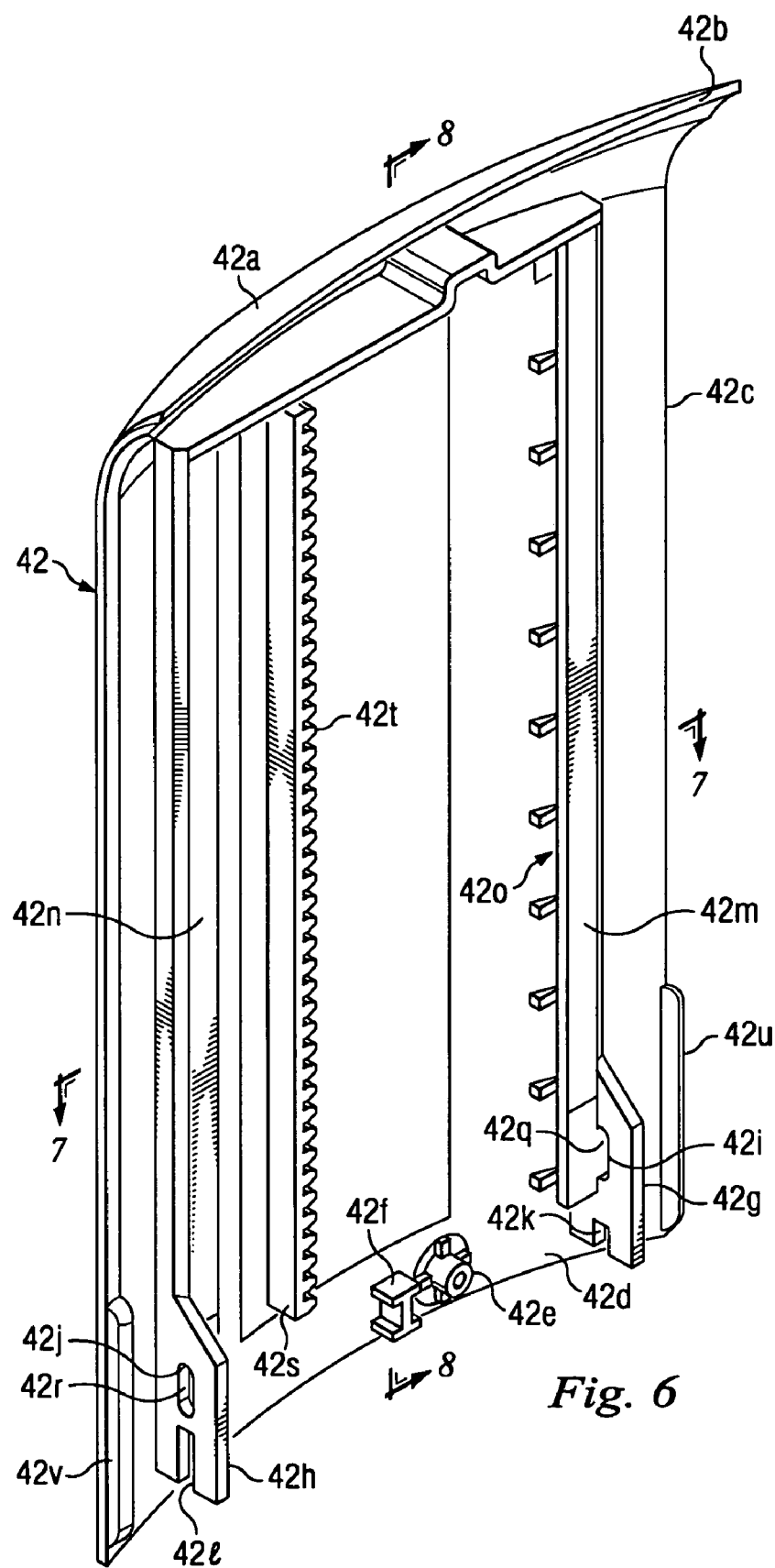
FIG. 6 is an enlarged perspective back view of a door panel depicted in FIGS. 4A and 5.
Figure 8:
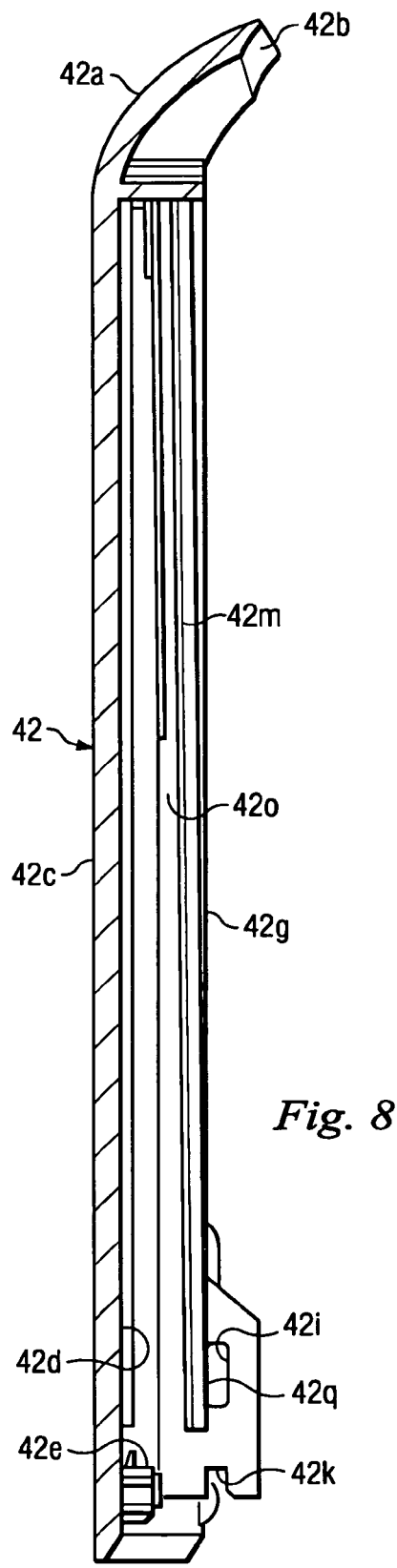
FIG. 8 is a sectional view of the door panel taken along line 8-8 of FIG. 6.

Referring to FIGS. 6-8, with continuing reference to FIGS. 1-5, the door panel 42 further includes an upper portion 42a having an end chamfer 42b, and a vertical portion 42c extending downward from the upper portion, the vertical portion 42c defining an internal side 42d from which a cylindrical protrusion 42e and an I-beam-shaped protrusion 42f extend. The cylindrical protrusion 42e is spaced in a parallel relation from the geometric center line of the door panel 42 by a predetermined spacing for reasons to be described. It is understood that, for cosmetic reasons, a horizontally-extending cosmetic shelf component may extend from the front bezel 28 and/or the chassis 26 and into any visible gap between the upper portion 42a of the door panel 42 and the front bezel 28 and/or the chassis 26.

A pair of walls 42g and 42h spaced in a parallel relation are connected to the internal side 42d, the walls 42g and 42h generally extending along the length of the internal side and having slots 42i and 42j, respectively, and notches 42k and 42l, respectively, formed therein. Track members 42m and 42n extend inwardly towards each other from the walls 42g and 42h, respectively, thereby defining channels 42o and 42p (FIG. 7) between the internal side 42d and the track members 42m and 42n, respectively. Tabs 42q and 42r extend from the walls 42g and 42h, respectively, and into the slots 42i and 42j, respectively. As shown more clearly in FIG. 8, as the track member 42m extends towards the upper portion 42a, the track member slopes towards the internal side 42d.

A rack 42s having a plurality of teeth 42t is connected to the internal side 42d, generally extends along the length of the internal side, and is spaced in a parallel relation from the geometric center line of the door panel 42 by a predetermined spacing for reasons to be described. A pair of tabs 42u and 42v extend from the internal side 42d, and each of the tabs is generally flush with one of the opposing vertically-extending edges of the door panel 42. A horizontally-extending wall 42w extends between the walls 42g and 42h.

Figure 9:
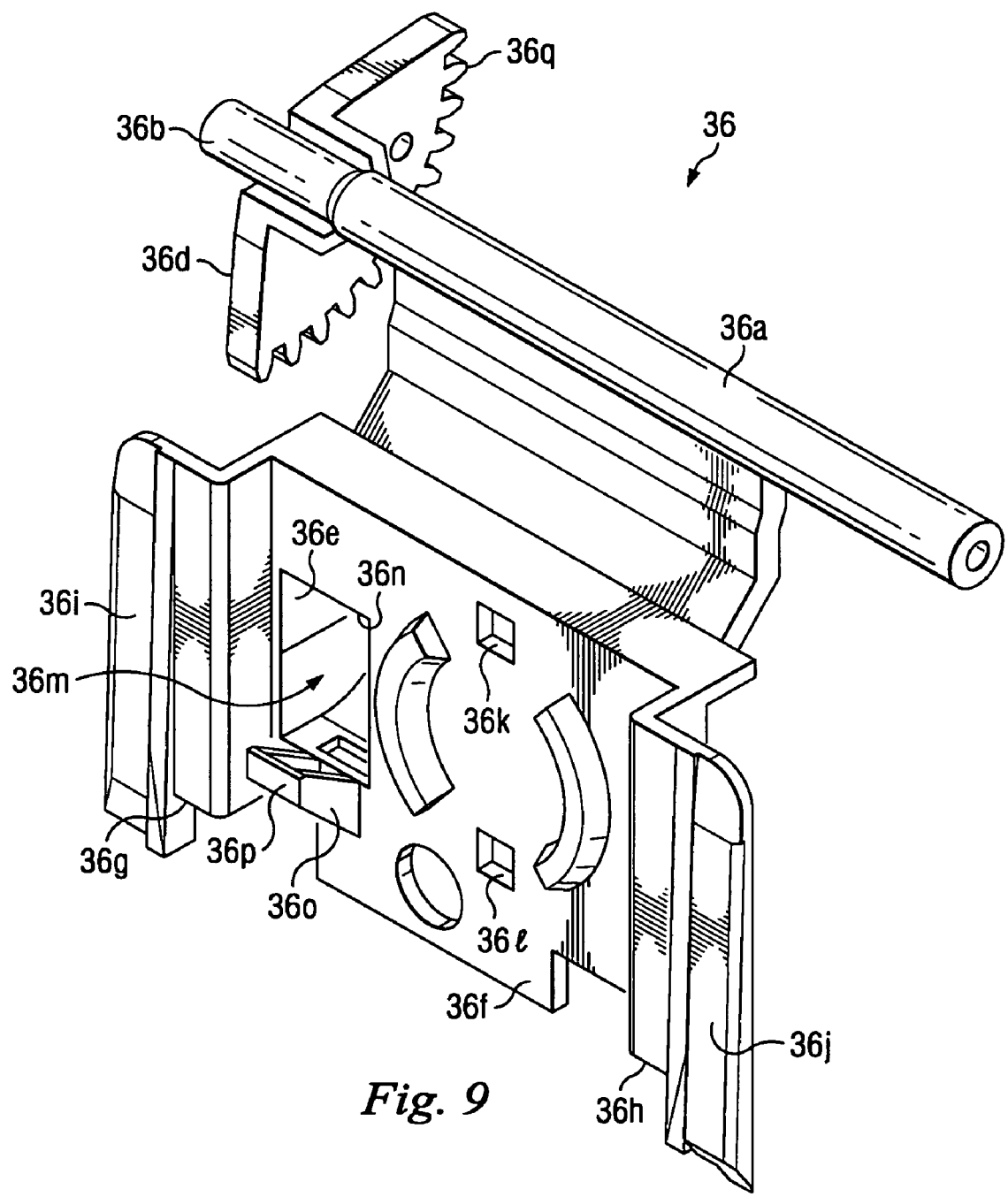
FIG. 9 is an enlarged perspective front view of a hinge plate depicted in FIGS. 4A and 5.

Referring to FIG. 9, with continuing reference to FIGS. 1-8, the hinge plate 36 further includes a plate portion 36f, and a pair of symmetric wing portions 36g and 36h extending from opposing sides of the plate portion and having distal portions 36i and 36j, respectively. A pair of vertically spaced through-openings 36k and 36l is formed in the plate portion 36f. The hub portion 36e defines a cavity 36m and an opening 36n to the cavity is formed in the plate portion 36f. A protrusion 36o having a distal end 36p extends from the plate portion 36f and is positioned adjacent the opening 36n. The gear portion 36d includes a plurality of teeth 36q.

Figure 10:
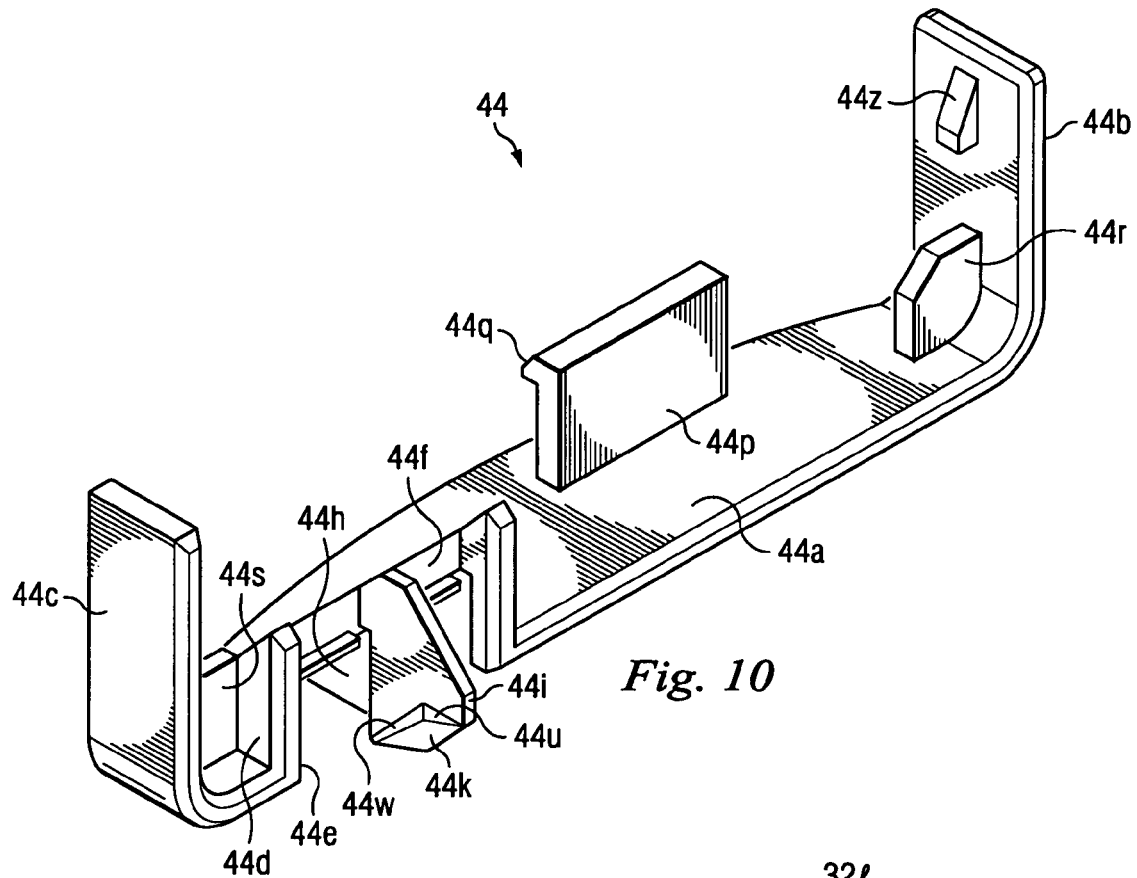
FIG. 10 is an enlarged perspective back view of a striker cap depicted in FIG. 4A.

Referring to FIGS. 10-11, with continuing reference to FIGS. 1-9, the striker cap 44 includes a horizontally-extending portion 44a and a pair of protrusions 44b and 44c extending upwards from the opposing ends of the portion 44a. A protuberance 44d extends upward from the portion 44a, and includes a frame 44e having a horizontally-extending portion 44f, and a ramp 44g that slopes downwards from the portion 44f to the portion 44a.

A striker 44h extends from the ramp 44g in a generally rearward direction, is generally parallel to the protrusions 44b and 44c, and includes a distal end portion 44i. Tapered surfaces 44j and 44k at the distal end portion 44i extend away from each other to form a general "V" shape, with a surface 44l defining the vertex of the "V" shape and extending at approximately a 45-degree angle from the horizontally-extending portion 44a. Tapered surfaces 44m and 44n (FIG. 11) at the distal end portion 44i extend away from each other to form a general "V" shape, with a surface 44o defining the vertex of the "V" shape.

A protrusion 44p having a distal end portion 44q extends upward from the portion 44a and an upright 44r extends from the portion 44a and the protrusion 44b. An upright 44s extends vertically from the portion 44a and horizontally between the protrusion 44c and the protuberance 44d. Symmetric surfaces 44t and 44u, and symmetric surfaces 44v and 44w, are defined due to the tapered extensions of the surfaces 44j and 44k, respectively. It is understood that the surfaces 44t and 44v are concealed from view in FIG. 10 but are the symmetric equivalent of the surfaces 44u and 44w, respectively. Symmetric surfaces 44x and 44y are defined due to the tapered extensions of the surfaces 44m and 44n, respectively. Symmetric protrusions 44z and 44aa extend inwardly towards each other from the protrusions 44b and 44c, respectively (the protrusion 44aa is concealed from view).

Figure 13:
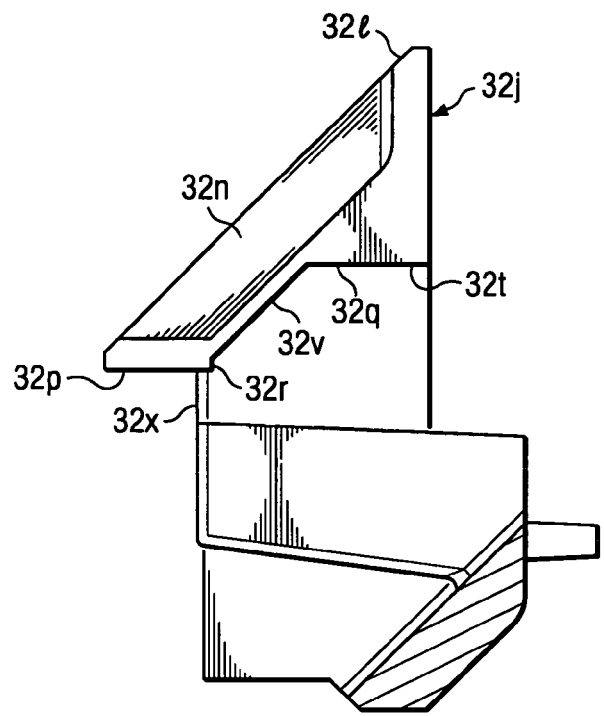
FIG. 13 is a sectional view of the latch taken along line 13-13 of FIG. 12.
Figure 12:
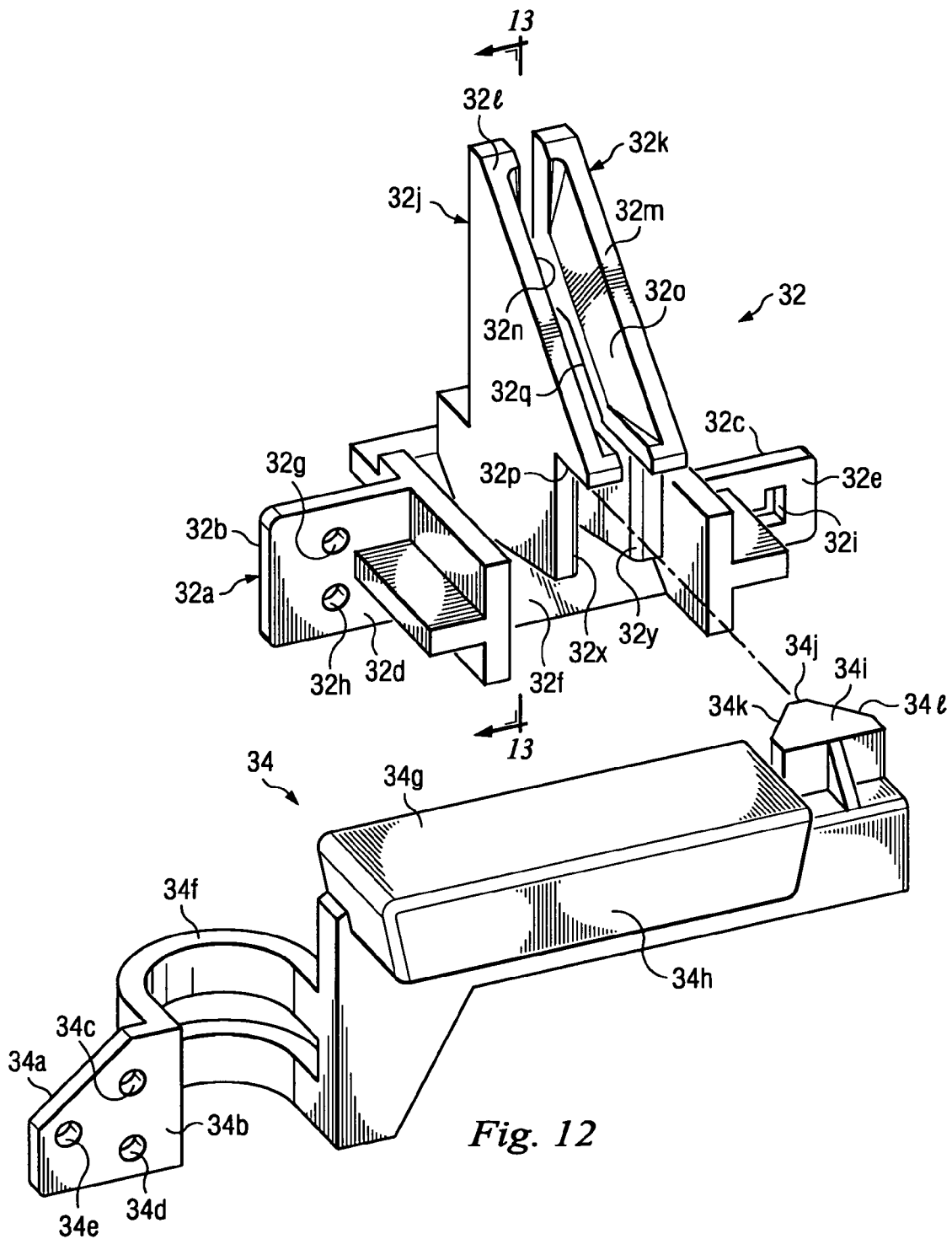
FIG. 12 is an exploded front view of a button and a latch depicted in FIG. 4A.

Referring to FIGS. 12-13, with continuing reference to FIGS. 1-11, the button 34 includes a tab 34a defining a surface 34b and having bores 34c, 34d and 34e formed therethrough. A flexible hinge 34f extends from the tab 34a and is connected to a button member 34g defining a surface 34h. An actuation protrusion 34i is connected to the button member 34g and defines a surface 34j and tapered surfaces 34k and 34l, with the tapered surfaces extending from the surface 34j and away from each other (the edges of the surfaces 34j, 34k and 34l are shown in FIG. 12).

The latch 32 includes a base 32a having tabs 32b and 32c which define vertically-extending surfaces 32d and 32e, respectively, and further includes a ramp portion 32f. Bores 32g and 32h are formed through the tab 32b and an L-shaped opening 32i is formed through the tab 32c.

Spaced arms 32j and 32k are cantilevered and extend from the ramp portion 32f, and are adapted to flex towards and away from each other under conditions to be described. A pair of co-planar latch faces 32l and 32m are defined by the arms 32j and 32k, respectively, and extend at a 45-degree angle. Symmetric tapered cavities 32n and 32o are formed in the arms 32j and 32k, respectively, and also extend at a 45-degree angle. An undercut 32p is formed in the arms 32j and 32k, and an undercut 32q is formed in the arms 32j and 32k, thereby defining vertically-extending surfaces 32r and 32s, respectively, horizontally-extending surfaces 32t and 32u, respectively, and surfaces 32v and 32w, respectively, which extend at a 45-degree angle. The surfaces 32r, 32t and 32v of the arm 32j are shown in FIG. 13, and the surfaces 32s, 32u and 32w of the arm 32k are concealed from view but are understood to be the symmetric equivalents to the surfaces 32r, 32t and 32v, respectively. Rounds 32x and 32y are partially formed in the arms 32j and 32k, respectively.

When the information handling system 10 is in its assembled condition, as shown in FIGS. 2-3, and with continuing reference to FIGS. 4-13, the surfaces 32d and 32e of the latch 32 engage the frame 28a of the front bezel 28 so that the pins 28c and 28d of the front bezel 28 extend through the bores 32g and 32h of the latch, respectively, and so that the L-shaped protrusion 28b of the front bezel 28 extends through the L-shaped opening 32i of the latch. It is understood that one or more of the pins 28c and 28d and the L-shaped protrusion 28b may be heat staked to more securely connect the latch 32 to the front bezel 28.

The surface 34b of the button 34 engages the frame 28a of the front bezel 28 so that the pins 28e and 28f of the front bezel 28 extend through the bores 34c and 34d, respectively, of the button 34, and so that another pin (concealed from view) extending from the frame 28a of the front bezel 28 extends through the bore 34e. It is understood that one or more of the pins 28e and 28f and the pin concealed from view may be heat staked to more securely connect the button 34 to the front bezel 28. The button member 34g of the button 34 extends through the frame 28a of the front bezel 28 so that the surface 34h is accessible from the front of the chassis 26 (see FIG. 2). As a result of the engagement between the button 34 and the frame 28a, the actuation protrusion 34i is positioned proximate the arms 32j and 32k of the latch 32, below the undercut 32p, so that the surfaces 34k and 34l nominally contact or are spaced from the rounds 32x and 32y, respectively.

As described above, the hinge plate 36 is hingedly connected via the rod 38 to the front bezel 28 and the torsion spring 39 is engaged with the hinge plate and the front bezel. The protrusions 40d and 40e of the rotary damper 40 extend through openings 28m and 28n (FIG. 4), respectively, formed in the plate portion 28k of the front bezel 28 (the opening 28m is concealed from view in FIG. 4), with the distal end portions 40f and 40g effecting a snap-fit connection between the rotary damper and the plate portion of the front bezel. The teeth 40c of the rotary damper 40 mesh with the teeth 36q of the gear portion 36d of the hinge plate 36.

As noted above, the door panel 42 is engaged with the hinge plate 36. More particularly, the distal portions 36i and 36j of the wing portions 36g and 36h, respectively, of the hinge plate 36 extend into the channels 42o and 42p, respectively, of the door panel 42 so that the distal portions 36i and 36j slidably engage the track members 42m and 42n, respectively. It is understood that the hinge plate 36 may be composed of a material suitable to facilitate the sliding engagement between the distal portions 36i and 36j of the hinge plate and the track members 42m and 42n, respectively of the door panel such as, for example, a nylon material such as, for example, glass-filled nylon such as, for example, 20% glass-filled nylon or 30% glass-filled nylon including 13% Teflon and 2% silicon.

The protrusions 48d and 48e of the rotary damper 48 extend through the openings 36k and 36l, respectively, of the hinge plate 36, with the distal end portions 36f and 36g effecting a snap-fit connection between the rotary damper and the hinge plate. The teeth 48d of the rotary damper 48 mesh with the teeth 42t of the rack 42s of the door panel 42.

As mentioned above, the spirally wound constant-force spring 46 is disposed in the hub portion 36e of the hinge plate 36, and the distal end 46a of the spring extends in a downward direction from the hub portion and is connected to the door panel 42. More particularly, the protrusion 42e of the door panel 42 extends through a hole 46b formed in the distal end 46a of the spring 46, thereby connecting the spring to the door panel.

As noted above, the striker cap 44 is connected to the door panel 42. More particularly, the uprights 44r and 44s of the striker cap 44 extend into the notches 42k and 42l, respectively, of the door panel 42. The protrusion 44b of the striker cap 44 is positioned between the tab 42u and the wall 42g of the door panel 42 so that the protrusion 44z at least partially extends into the slot 42i and engages the wall 42g. Similarly, the protrusion 44c of the striker cap 44 is positioned between the tab 42v and the wall 42h of the door panel 42 so that the protrusion 44aa at least partially extends into the slot 42j and engages the wall 42h. The distal end portion 44q of the protrusion 44p of the striker cap 44 extends over and engages the I-beam-shaped protrusion 42f of the door panel 42, so that the protrusion 44p facilitates in preventing the distal end 46a of the spring 46 from disengaging from the protrusion 42e of the door panel.

It is understood that one or more of the engagements between the I-beam-shaped protrusion 42f and the protrusion 44p, the protrusion 44z and the wall 42g, and the protrusion 44aa and the wall 42h form a snap-fit connection between the striker cap 44 and the door panel 42, with the bottom surface of the horizontally-extending portion 44a of the striker panel being generally flush with the end of the door panel 42 opposing the upper portion 42a of the door panel.

In operation, the information handling system 10 is in its assembled condition described above, and the door panel assembly 30 is normally closed, as shown in FIG. 2, during which time the striker 44h is operably engaged with the latch 32 so that the door panel assembly 30 is in a latched configuration.

More particularly, with continuing reference to FIGS. 1-13, the striker 44h is received between the arms 32j and 32k of the latch 32, extending between the arms and into the region between the arms defined by the undercut 32q, below the horizontally-extending surfaces 32t and 32u. The door panel assembly 30, and therefore the door panel 42 and the striker cap 44, are prevented from rotating about the rod 38 and away from the frame 28a due to one or more of the engagements between the surfaces 44v and 44w and the angularly-extending surfaces 32v and 32w, respectively, between the surfaces 44x and 44y and the angularly-extending surfaces 32v and 32w, respectively, between the surfaces 44v and 44w and the vertically-extending surfaces 32r and 32s, respectively, and/or between the surfaces 44x and 44y and the vertically-extending surfaces 32r and 32s, respectively. These one or more engagements occur because the torsion spring 39 is biased due to the generally vertically-extending positions of the hinge plate 36 and the door assembly 30 relative to the torsion spring, and thus the torsion spring is continuously urging the hinge plate 36 and the door panel assembly 30 to rotate about the rod 38.

Figure 14A:
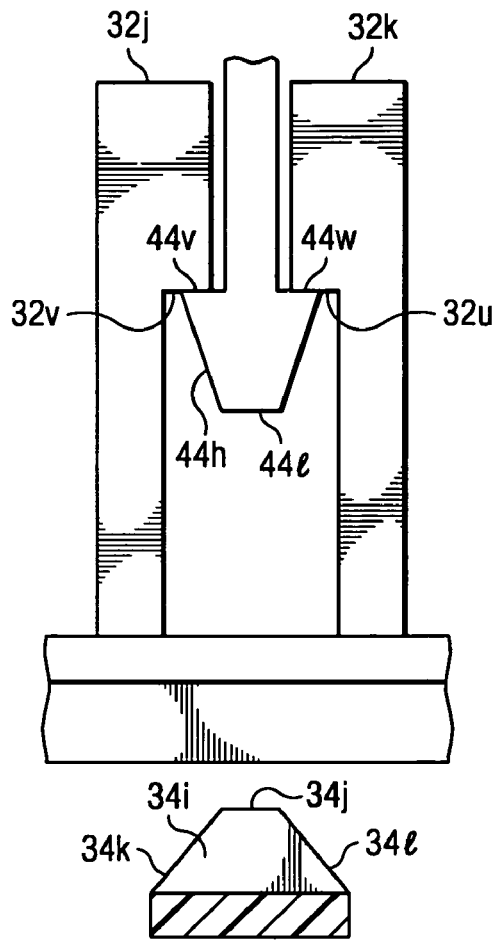
FIG. 14A is a partial sectional/partial elevational view depicting the button and the latch of FIGS. 4A and 12-13 in an operational mode.

Moreover, referring to FIG. 14A, with continuing reference to FIGS. 1-13, the door panel assembly 30, and therefore the door panel 42 and the striker cap 44, are prevented from translating in an upward direction, relative to the front bezel 28, due to one or more of the engagements between the surfaces 44v and 44w and the angularly-extending surfaces 32v and 32w, respectively, between the surfaces 44t and 44u and the angularly-extending surfaces 32v and 32w, respectively, between the surfaces 44v and 44w and the horizontally-extending surfaces 32t and 32u, respectively, and/or between the surfaces 44t and 44u and the horizontally-extending surfaces 32t and 32u, respectively. These one or more engagements occur because the constant-force spring 46 is biased due to the vertical extension of the door 42 relative to the hinge plate 36, which causes the distal end 46a of the spring to be appreciably extended from the cavity 36m in which the majority of the spring is disposed, and thus the spring is continuously urging the door panel assembly 30 to translate upwards and relative to the hinge plate.

It is understood that the door panel 42 may experience a local bulging in the vicinity of the torsion spring 39 due to the location of and the outwardly-directed forces exerted by the torsion spring 39 on the door panel. This may be especially true when the door panel assembly 30 is in its latched configuration. However, the track member 42m of the door panel 42 slopes inwards towards the internal side 42d of the door panel, thereby forcing the door panel to be positioned closer to the hinge plate 36 and the frame 28a of the front bezel 28, and thereby minimizing any bulging of the door panel in the vicinity of the torsion spring 39.

Figure 14B:
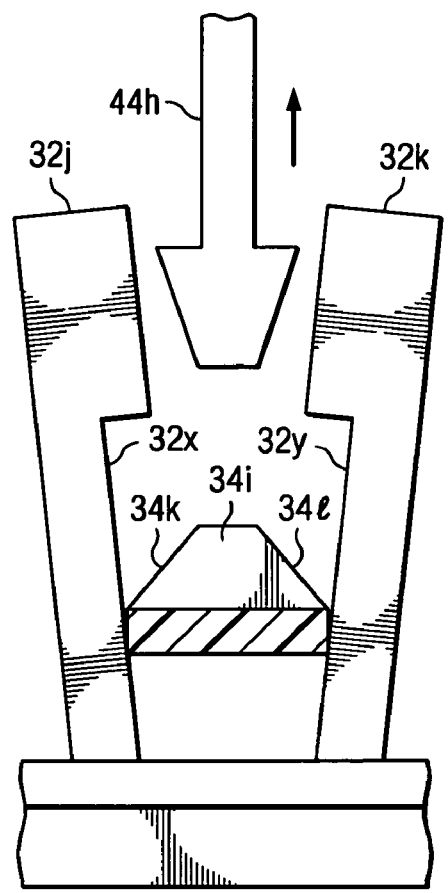
FIG. 14B is a view similar to that of FIG. 14A but depicting the button and the latch in another operational mode.

Referring to FIG. 14B, with continuing reference to FIG. 14A and FIGS. 1-13, the door panel assembly 30 is placed in an unlatched configuration by applying pressure to the surface 34h of the button member 34g of the button 34 so that the hinge 34f flexes and the button 34, with the exception of the tab 34a, slightly rotates in a counterclockwise direction about the tab, and so that the actuation protrusion 34i travels towards and is received between the arms 32j and 32k of the latch.

During this time, the tapered surfaces 34k and 34l of the button 34 contact and push against the arms 32j and 32k, respectively, including the rounds 32x and 32y, respectively, thereby forcing the arms 32j and 32k to flex apart from each other. As a result, the striker 44h is disengaged from the surfaces 32r and 32s, the surfaces 32t and 32u, and/or the surfaces 32v and 32w, and the door panel assembly 30 is unlatched from the latch 32. The tapers of the tapered surfaces 34k and 34l facilitate the gradual entry of the actuation protrusion 34i between the arms 32j and 32k of the latch 32.

It is understood that a component such as a sheet-metal stop may be placed behind the latch 32, opposite the side of the latch engaged by the actuation protrusion 34i of the button 34, in order to maintain the latch 32 as substantially immobile, thereby preventing the heat-staked junctions between the pins 28c and 28d of the front bezel 28 and the tab 32b of the latch, and/or between the L-shaped protrusion 28b of the front bezel and the tab 32c of the latch, from undergoing any appreciable loading and possibly damage.

After the door panel assembly 30 is unlatched from the latch 32, pressure is no longer applied to the surface 34h of the button 34, thereby causing the actuation protrusion 34i to be removed from between the arms 32j and 32k of the latch so that the arms flex back towards each other to their original, at-rest positions corresponding to the above-described latched configuration.

Figure 15A:
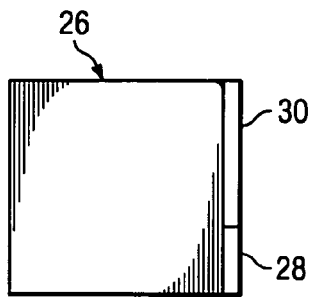
FIGS. 15A, 15B and 15C are elevational views of the portion of the information handling system shown in FIG. 2 but depicting an operational mode of a door panel assembly as a function of time.
Figure 15B:
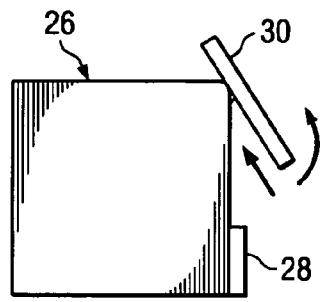
Figure 15C:
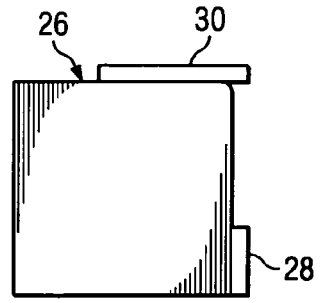

Referring to FIGS. 15A, 15B and 15C, with continuing reference to FIGS. 1-14, when the door panel assembly 30 is placed in its unlatched configuration, that is, upon the unlatching of the door panel assembly 30 from its latched configuration (FIG. 15A), the torsion spring 39 causes the hinge plate 36, and therefore the door panel assembly 30, to rotate outward and upward, about the rod 38. Simultaneously with this rotation, as shown in FIG. 15B, the distal end 46a of the constant-force spring 46 retracts towards the cavity 36m, thereby applying a pulling force to the protrusion 42e and causing the door panel assembly 30 to translate along and relative to the hinge plate 36 during the rotation of the door assembly. That is, the track members 42m and 42n of the door panel 42 engage and slide against the distal portions 36i and 36j, respectively, of the wing portions 36g and 36h, respectively, of the hinge plate 36, while the distal portions 36i and 36j continue to extend in the channels 42n and 42o, respectively, albeit at different locations within the channels over time as the door panel translates.

The rotary portion 40a of the rotary damper 40 rotates in place and, due to the meshing between the teeth 40c of the rotary damper and the teeth 36q of the hinge plate 36, the rotary damper at least partially resists and/or controls the rotational velocity of the door panel assembly 30 and causes the hinge plate and therefore the door panel assembly to rotate smoothly. Similarly, the rotary portion 48a of the rotary damper 48 rotates in place and, due to the meshing between the teeth 48c of the rotary damper and the teeth 42t of the rack 42s of the door panel 42, the rotary damper at least partially resists and/or controls the translational velocity of the door panel assembly 30 and causes the door panel assembly to translate smoothly. Since the torque rating of the rotary damper 40 is lower than the torque rating of the rotary damper 48, the door panel assembly 30 rotates faster than it translates.

The rotation and translation of the door panel assembly 30 continues until the door panel assembly rotates 90 degrees and the striker cap 44 engages the hinge plate 36 to stop the translation of the door panel assembly 30 relative to the hinge plate, thereby fully opening and exposing the frame 28a of the front bezel 28, as shown in FIG. 15C.

It is understood that, during the above-described motion of the door panel assembly 30, the application of force on the door panel 42 by the constant-force spring 46 may tend to urge the door panel to twist in a plane that is either generally parallel to or generally coplanar with the plate portion 36f of the hinge plate 36. It is further understood that the predetermined parallel-relation spacings between the geometric center line of the door panel 42 and the protrusion 42e (at which location the spring 46 applies the force to the door panel), and between the geometric center line of the door panel and the teeth 42t of the rack 42s of the door panel (at which location the rotary damper 48 at least partially resists and/or controls the translational velocity of the door panel), may be optimized to reduce the probability of the twisting of the door panel such as, for example, the foregoing spacings from the geometric center line of the door panel 42 may generally be equidistant from either side of the geometric center line.

Further, it is understood that, during the rotation of the door panel assembly 30, the torsion spring 39's plating may at least partially reduce any noise due to any rubbing of the torsion spring against the hinge plate 36. Also, during the rotation of the door panel assembly 30, the chamfer 42b enables the upper portion 42a of the door panel 42 to clear the top of the chassis 26.

Still further, it is understood that, during the retraction of the distal end 46a of the spring 46 during the translation of the door panel assembly 30, the portions of the spring being retracted may slide along and/or contact the distal end 36p of the protrusion 36o so that the protrusion facilitates in guiding the spring back into the cavity 36m of the hinge plate 36. Also, it is understood that, because the door panel assembly 30 automatically rotates and translates, the probability of damage to the door panel assembly, due to its handling by an operator, is reduced.

Moreover, it is understood that, although the door panel assembly 30 simultaneously rotates and translates, the rotation of the door panel assembly is independent of its translation, and vice versa.

Figure 16A:
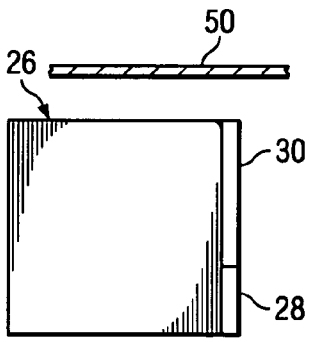
FIGS. 16A, 16B and 16C are views similar to that of FIGS. 15A, 15B and 15C but depicting another operational mode of the door panel assembly as a function of time.
Figure 16B:
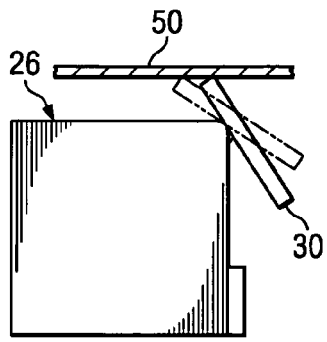
Figure 16C:
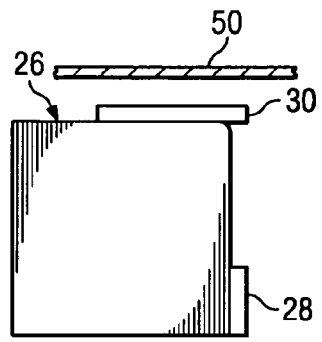

For example, referring to FIGS. 16A, 16B and 16C, an obstacle 50 may be positioned above the chassis 26 and the door panel assembly 30 may be initially latched in the manner described above, as shown in FIG. 16A. Upon the unlatching of the door panel assembly 30, the door panel assembly begins to simultaneously rotate and translate in the manner described above. However, the door panel assembly 30 subsequently contacts the obstacle 50, thereby preventing further vertical translation, as shown in FIG. 16B. Since the rotational and translational motions of the door panel assembly 30 are independent of each other, the door panel assembly only rotates until the obstacle 50 no longer prevents the door panel assembly from translating, at which point the door panel assembly resumes both rotation and translation and continues such motion until full rotation and translation has occurred, as shown in FIG. 16C and in a manner similar to that described above. Thus, the clearance required between the chassis 26 and the obstacle 50 is minimized.

Figure 17A:
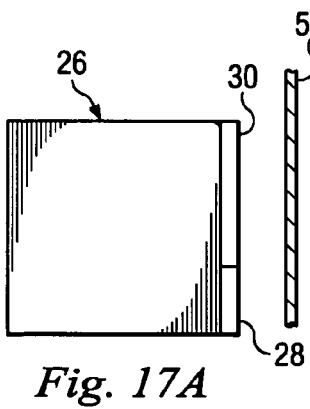
FIGS. 17A, 17B and 17C are views similar to that of FIGS. 16A, 16B and 16C but depicting yet another operational mode of the door panel assembly as a function of time.
Figure 17B:
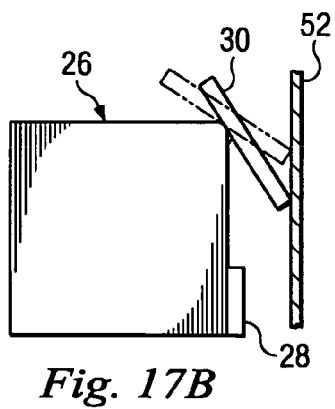
Figure 17C:
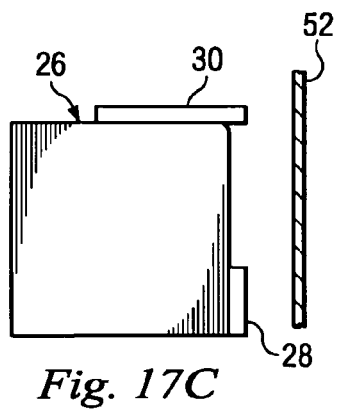

For another example, referring to FIGS. 17A, 17B and 17C, an obstacle 52 may be positioned in front of the chassis 26 and the door panel assembly may be initially latched in the manner described above, as shown in FIG. 17A. Upon the unlatching of the door panel assembly 30, the door panel assembly begins to simultaneously rotate and translate in the manner described above. However, the door panel assembly 30 subsequently contacts the obstacle 52, thereby preventing further rotation, as shown in FIG. 17B. Because the rotational and translational motions of the door panel assembly 30 are independent of each other, the door panel assembly only translates until the obstacle 52 no longer prevents the door panel assembly from rotating, at which point the door panel assembly resumes both rotation and translation and continues such motion until full rotation and translation has occurred, as shown in FIG. 17C and in a manner similar to that described above. Thus, the clearance required between the chassis 26 and the obstacle 52 is minimized.

In view of the foregoing, it is understood that door panel assembly 30 is movable, relative to the chassis 26, along a wide variety of motion paths, and may translate then rotate, rotate then translate, rotate and translate simultaneously and/or undergo any combination thereof. It is further understood that the translation and/or rotation of the door panel assembly 30 may only be temporarily interrupted.

To close the door panel assembly 30, an operator grasps the door panel assembly and then rotates and translates the door panel assembly, overcoming the forces generated by the springs 39 and 46, so that the striker 44h of the striker cap 44 engages the arms 32j and 32k of the latch 32, thereby closing the door panel assembly and placing the door panel assembly in the latched configuration. It is understood that the door panel assembly 30 may be rotated and translated in several ways in order to place the door panel assembly in its latched configuration.

Figure 18A:
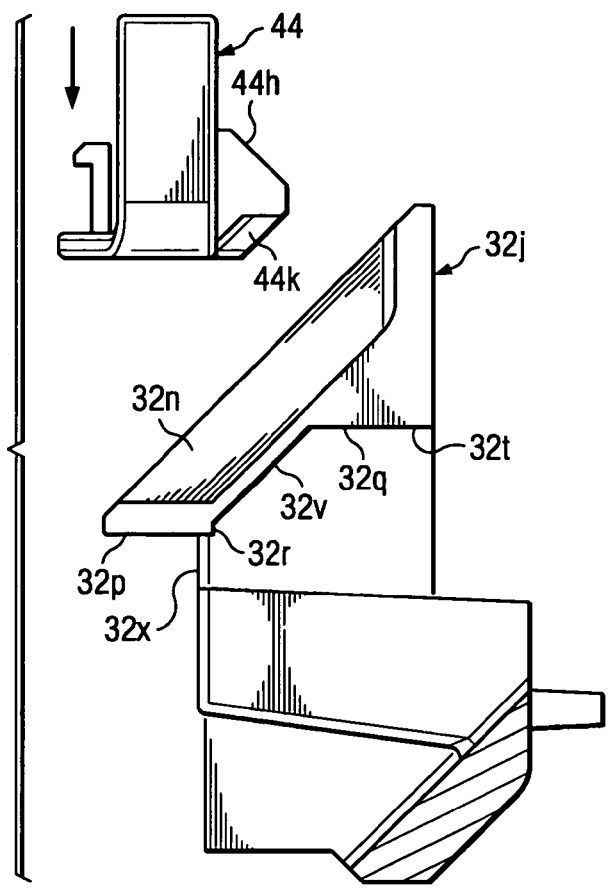
FIGS. 18A and 18B are views similar to that of FIG. 13 but depicting the approach of a striker at different angles.

For example, the door panel assembly 30 may be rotated 90 degrees from the position shown in FIG. 17C to a generally vertical orientation, and then may be translated vertically downwards. As shown in FIG. 18A, if the door panel assembly 30 is closed in such a manner, the striker 44*h* of the striker cap 44 approaches the latch 32 at a 90-degree angle from the horizontal, with the end of the surface 44*l* adjacent the surface 44*o* defining the leading edge of approach to the latch, with respect to the surface 44*l* (the surfaces 44*l* and 44*o* are shown in detail in FIG. 11). It is understood that, during the approach of the striker 44*h* at a 90-degree angle from the horizontal, the motion path of the striker 44*h*, relative to the latch 32, may vary from that which is depicted in FIG. 18A.

The striker 44*h* travels between the arms 32*j* and 32*k*, forcing the arms apart so that the striker enters into the region between the arms defined by the undercut 32*q*, below the horizontally-extending surfaces 32*t* and 32*u*, thereby placing the door panel assembly 30 in the above-described latched configuration. The tapered surfaces 44*m* and 44*n* facilitate the entrance and reception of the striker 44*h* into the region between the arms 32*j* and 32*k* defined by the undercut 32*q*, and the forcing of the arms apart. Moreover, the tapered surfaces 44*j* and 44*k*, and the corresponding 45-degree angular extensions of the tapered surfaces 44*j* and 44*k* and of the cavities 32*n* and 32*o*, may also facilitate the entrance and reception of the striker 44*h* into the region between the arms 32*j* and 32*k* defined by the undercut 32*q*, and the forcing of the arms apart.

Figure 18B:
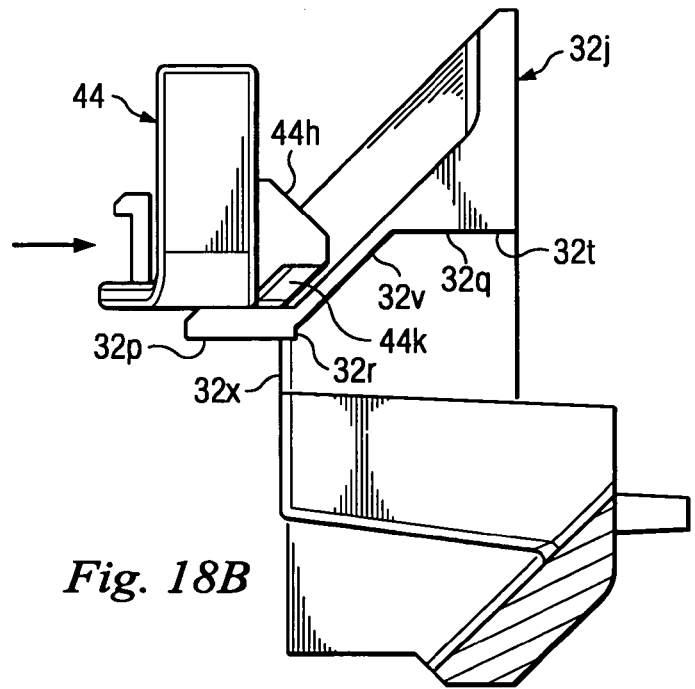

In the alternative, the door panel assembly 30 may be translated horizontally until the wall 42*w* of the door panel 42 engages the hinge plate 36, thereby preventing further translation, and then may be rotated 90 degrees. As shown in FIG. 18B, if the door panel assembly 30 is closed in such a manner, the striker 44*h* of the striker cap 44 approaches the latch 32 at a 0-degree angle from the horizontal, with the end of the surface 44*l* adjacent the surface 44*i* defining the leading edge of approach towards the latch, with respect to the surface 44*l* (the surfaces 44*l* and 44*i* are shown in detail in FIG. 11). It is understood that, during the approach of the striker 44*h* at a 0-degree angle from the horizontal, the motion path of the striker 44*h*, relative to the latch 32, may vary from that which is depicted in FIG. 18B.

The striker 44*h* travels between the arms 32*j* and 32*k*, forcing the arms apart so that the striker enters into the region between the arms defined by the undercut 32*q*, below the horizontally-extending surfaces 32*t* and 32*u*, thereby placing the door panel assembly 30 in the above-described latched configuration. The tapered surfaces 44*j* and 44*k*, and the corresponding 45-degree angular extensions of the tapered surfaces 44*j* and 44*k* and of the cavities 32*n* and 32*o*, facilitate the entrance and reception of the striker 44*h* into the region between the arms 32*j* and 32*k* defined by the undercut 32*q*, and the forcing of the arms apart. Moreover, the tapered surfaces 44*m* and 44*n* may also facilitate the entrance and reception of the striker 44*h* into the region between the arms 32*j* and 32*k* defined by the undercut 32*q*, and the forcing of the arms apart.

Notwithstanding the above, it is understood that the door panel assembly 30 may be closed using a wide variety of combinations of translational and rotational motion.

In view of the foregoing, it is understood that the latch 32 may be composed of any type of material that is suitable for repeated engagement with and disengagement from the striker 44*h* such as, for example, a nylon material. It is further understood that the striker 44*h* may be composed of any type of material that is suitable for repeated engagement with and disengagement from the latch 32 such as, for example, a polycarbonate/ABS material (PC/ABS). Also, it is understood that the striker 44*h* and the latch may be composed of different materials to reduce the possibility of wear and tear on the striker and/or the latch. For example, the striker 44*h* may be composed of a nylon material and the latch 32 may be composed of PC/ABS.

Figure 19:
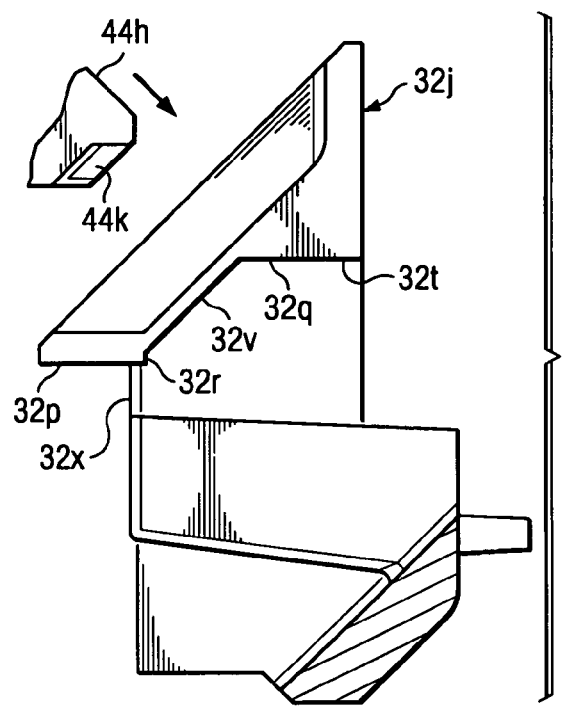
FIG. 19 is a view similar to that of FIGS. 18A and 18B but depicting the approach of the striker at another angle.

It is understood that the latch 32 may be used in conjunction with the striker 44*h*, but with an alternate door panel assembly. For example, an exemplary door panel assembly may be a link in a four-bar-linkage system which enables the striker 44*h* to approach the latch 32 at a 45-degree angle from the horizontal, as shown in FIG. 19, with neither end of the surface 44*l* leading the other as the striker approaches the latch, that is, with neither the end of the surface 44*l* adjacent the surface 44*o*, nor the opposing end of the surface 44*l* adjacent the surface 44*i*, leading the other as the striker approaches the latch (the surfaces 44*l*, 44*o* and 44*i* are shown in detail in FIG. 11). It is understood that, during the approach of the striker 44*h* at a 45-degree angle from the horizontal, the motion path of the striker 44*h*, relative to the latch 32, may vary from that which is depicted in FIG. 19. The striker 44*h* engages the latch 32 in the manner substantially identical to that described above in connection with the 0 or 90-degree approaches. It is understood that the striker cap 44 may be removed from the apparatus, or modified, as long as the striker 44*h* remains so as to be operably engageable with the latch 32.

In view of the foregoing, it is understood that the latch 32 is multidirectional and may receive the striker 44*h* from any approach angle between 0 and 90 degrees from the horizontal, with the end of the surface 44*l* adjacent the surface 44*i* defining the leading edge of approach with respect to the surface 44*l* for angles of approach ranging from about 0 degrees to about 45 degrees from the horizontal, as viewed in FIGS. 18A, 18B and 19, and with the end of the surface 44*l* adjacent the surface 44*o* defining the leading edge of approach with respect to the surface 44*l* for angles of approach ranging from about 45 degrees to about 90 degrees from the horizontal, as viewed in FIGS. 18A, 18B and 19.

It follows that any door-panel-type component connected to the latch 44*h* may be closed from any direction between 0 and 90 degrees from the horizontal, as long as physically permitted by the geometry of the front bezel 28, the chassis 26 and/or the door panel component and its accompanying structure such as, for example, the hinge plate 36 or a four-bar-linkage system.

In view of the foregoing, it is understood that the latch 32 and/or the striker 44*h* are not limited to use with the door panel assembly 30, the door panel 42, the striker 44 and/or any other of the above-described components, and instead the latch 32 and/or the striker 44*h* may be used with a wide variety of devices such as, for example, a wide variety of door panels, hatches, doors, movable panels, door panel assemblies, access panels, access devices and/or other components requiring one or more latching engagements therebetween. It is further understood that the latch 32 and/or the striker 44*h* are not limited to use in applications for information handling systems, and instead may be used in a wide variety of other latching applications.

It is understood that further variations may be made in the foregoing without departing from the scope of the disclosure. For example, although the chassis 26 is shown in an upright position in FIG. 2, it is understood that the chassis may be placed on its side without affecting the above-described operation. Moreover, it is understood that each of the above-described components may be composed of a wide variety of materials.

Any foregoing spatial references such as, for example, "upper," "lower," "above," "below," "rear," "between," "vertical," "angular," "horizontal,"etc., are for the purpose of illustration only and do not limit the specific orientation or location of the structure described above.

It is understood that one or more of the above-described embodiments and/or variations may be combined in whole or in part with any one or more of the other above-described embodiments and/or variations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system comprising:
   a chassis having a base;
   a door panel movably coupled to the chassis;
   a latch striker coupled to the door panel and having a striker face disposed at a non-orthogonal angle with the door panel and including a beveled end adjacent the striker face;
   a latch, connected to the base and including a pair of flexible arms forming an opening having tapered latch faces, the opening being disposed at an angle with the base for matched engagement with the angle of the striker face, the flexible arms being operable to move apart from an at rest position in response to the tapered faces receiving the beveled end of the latch striker and subsequently return to the at rest position to retain the latch striker; and
   an actuator mounted on the base adjacent the latch, the actuator being operable to flex the arms apart sufficient to release the retained latched striker.

2. The information handling system of claim 1 wherein the striker face angle is about a 45-degree angle.

3. The information handling system of claim 1 wherein the opening of the flexible arms is about a 45-degree angle.

4. An information handling system comprising:
   a chassis;
   a rotating and translating door panel coupled to the chassis;
   a base connected to the chassis;
   a latch striker coupled to the door panel and having a striker face disposed at a non-orthogonal angle with the door panel and including a beveled end adjacent the striker face;
   a latch, connected to the base and including a pair of flexible arms forming an opening having tapered latch faces, the opening being disposed at an angle with the base for matched engagement with the angle of the striker face, the flexible arms being operable to move apart from an at rest position in response to the tapered faces receiving the beveled end of the latch striker and subsequently return to the at rest position to retain the latch striker; and
   an actuator mounted on the base adjacent the latch, the actuator being operable to flex the arms apart sufficient to release the retained latched striker.

5. The information handling system of claim 4 wherein the striker face angle is about a 45-degree angle.

6. The information handling system of claim 4 wherein the opening of the flexible arms is about a 45-degree angle.

7. A method comprising:
   providing a chassis having a base;
   coupling a movable door panel to the chassis;
   coupling a latch striker to the door panel and having a striker face disposed at a non-orthogonal angle with the door panel and including a beveled end adjacent the striker face;
   connecting a latch to the base and including a pair of flexible arms forming an opening having tapered latch faces, the opening being disposed at an angle with the base for matched engagement with the angle of the striker face, the flexible arms being operable to move apart from an at rest position in response to the tapered faces receiving the beveled end of the latch striker and subsequently return to the at rest position to retain the latch striker; and
   mounting an actuator on the base adjacent the latch, the actuator being operable to flex the arms apart sufficient to release the retained latched striker.

* * * * *